US012747017B2

(12) United States Patent
Nguyen et al.

(10) Patent No.: US 12,747,017 B2
(45) Date of Patent: Sep. 29, 2026

(54) LANDING GEAR WITH SIMPLIFIED MANOEUVRING MECHANISM

(71) Applicant: SAFRAN LANDING SYSTEMS, Velizy Villacoublay (FR)

(72) Inventors: Nicolas Nguyen, Moissy-Cramayel (FR); Philippe Henrion, Moissy-Cramayel (FR); Bertrand Dubacher, Moissy-Cramayel (FR); Bertrand Euzet, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 19/142,046

(22) PCT Filed: Dec. 18, 2023

(86) PCT No.: PCT/EP2023/086456
§ 371 (c)(1),
(2) Date: Jun. 20, 2025

(87) PCT Pub. No.: WO2024/133143
PCT Pub. Date: Jun. 27, 2024

(65) Prior Publication Data

US 2026/0217365 A1 Jul. 30, 2026

(30) Foreign Application Priority Data

Dec. 23, 2022 (FR) ...................................... 2214456

(51) Int. Cl.
*B64C 25/26* (2006.01)
*B64C 25/12* (2006.01)
*B64C 25/20* (2006.01)

(52) U.S. Cl.
CPC .............. *B64C 25/20* (2013.01); *B64C 25/12* (2013.01); *B64C 25/26* (2013.01); *B64C 2025/125* (2013.01)

(58) Field of Classification Search
CPC ......... B64C 25/00; B64C 25/12; B64C 25/26; B64C 2025/125
See application file for complete search history.

(56) References Cited

U.S. PATENT DOCUMENTS 2,437,135 A * 3/1948 Blair ....................... B64C 25/30 244/102 R
9,004,401 B2 * 4/2015 Evans ..................... B64C 25/26 244/102 SL (Continued)

FOREIGN PATENT DOCUMENTS

EP 3 486 166 A1 5/2019
EP 2 437 978 B1 6/2021

(Continued)

OTHER PUBLICATIONS

International Search Report issued on Mar. 18, 2024 in International Application No. PCT/EP2023/086456.

(Continued)

*Primary Examiner* — Tye William Abell
(74) *Attorney, Agent, or Firm* — Sughrue Mion, PLLC

(57) ABSTRACT

An aircraft provided with a landing gear includes a leg that pivots between a retracted position and a deployed position, a main brace having a state in which the leg is stabilized in the deployed position, a maneuvering structure, and a stabilizing structure. The maneuvering mechanism includes a rotary actuator which is positioned in a hold outside a main force path when the leg is in the deployed position and which actuates a single crank, and a connecting rod having a first end hinged about a first axis to an element connected to the leg and a second end hinged about a second axis to the (Continued)

crank so that the connecting rod and the crank have a first relative angular position so that the connecting rod and the crank stabilize the strut in the retracted position and form the stabilizing structure.

7 Claims, 5 Drawing Sheets

(56) References Cited

U.S. PATENT DOCUMENTS

| | | | | |
|---|---|---|---|---|
| 2012/0080559 | A1* | 4/2012 | Keller | B64C 25/14 244/102 A |
| 2019/0144104 | A1* | 5/2019 | Fortier | B64C 25/26 244/102 R |
| 2021/0086892 | A1* | 3/2021 | Anderberg | F16H 21/44 |

FOREIGN PATENT DOCUMENTS

| | | | |
|---|---|---|---|
| FR | 1353047 | A | 2/1964 |
| FR | 1431737 | A | 3/1966 |
| WO | 2018/182496 | A1 | 10/2018 |

OTHER PUBLICATIONS

Written Opinion issued on Mar. 18, 2024 in International Application No. PCT/EP2023/086456.

* cited by examiner

LANDING GEAR WITH SIMPLIFIED MANOEUVRING MECHANISM

CROSS-REFERENCE TO RELATED APPLICATIONS

This application is a National Phase Entry of PCT International Application No. PCT/EP2023/086456, filed on Dec. 18, 2023, which claims priority to French Patent Application No. FR 2214456 filed on Dec. 23, 2022, the contents of each of which being herein incorporated by reference in their entireties.

The present invention relates to aviation and more particularly to an aircraft landing gear.

PRIOR ART OF THE INVENTION

Aircraft landing gear is known to comprise a leg that is pivotally mounted on an aircraft structure between a deployed position and a retracted position. The leg is stabilised in the deployed position by means of a bracing member generally comprising two connecting rods hinged together, one of the connecting rods being coupled to the leg and the other coupled to the aircraft structure. The two connecting rods are held in a substantially aligned position by a stabilising member forming a lock that can be unlocked to allow the leg to be raised from the deployed position to the retracted position.

To that end, such landing gear generally comprises an unlocking actuator for unlocking the stabilising member and breaking the alignment of the bracing member, and a control actuator for raising the leg to the retracted position.

The landing gear also comprises a member for holding the leg in the retracted position.

The plurality of mechanical members holding the leg in its two positions and allowing the leg to be manoeuvred between these two positions can cause weight, bulk and breakdowns. This also contributes to the aircraft's ecological footprint, which needs to be reduced. In addition, this plurality of mechanical components generates a relatively high cost.

OBJECT OF THE INVENTION

The object of the invention is therefore to simplify and improve the means used for unlocking the end positions and manoeuvring the landing gear.

SUMMARY OF THE INVENTION

To this end, the invention provides a landing gear comprising a leg having a hinge for pivoting between a retracted position and a deployed position, a main brace having a state in which the leg is stabilised in the deployed position, in which the main brace defines a main force take-up path, a mechanism for manoeuvring the leg at least from its deployed position to its retracted position, and a mechanism for stabilising the leg in the retracted position. The manoeuvring mechanism comprises a rotary actuator that is positioned outside the main force path when the leg is in the deployed position and actuates a single crank, and a connecting rod having a first end hinged about a first axis to an element connected to the leg and a second end hinged about a second axis to the crank so that the connecting rod and the crank have a first relative angular position in which the first axis and the second axis are in a first alignment relative to the shaft of the actuator when the leg is in the retracted position in such a way that the connecting rod and the crank stabilise the leg in the retracted position and form the mechanism for stabilising the leg in the retracted position.

The rotary actuator thus provides a dual function and makes it possible to have a small number of actuators. In addition, such a configuration of the actuator makes it possible to arrange the actuator substantially at the same level in service as the hinge of the leg on the structure of the aircraft, and therefore to limit the depth of the space accommodating the landing gear in the retracted position of the leg. This results in a reduction in the overall bulk of the landing gear, making it easier to be installed in the hold of the aircraft. In addition, this arrangement of the rotary actuator limits the stresses to which it is subjected, contributing to its durability.

According to a particular embodiment, the element to which the first end of the connecting rod is hinged is a part of the main brace and the connecting rod and the crank have a second relative angular position in which the first axis and the second axis are in a second alignment relative to the shaft of the actuator when the leg is in the deployed position such that the connecting rod and the crank stabilise the main brace in its holding state to form a mechanism for stabilising the main brace in its stabilising state.

The invention also relates to an aircraft comprising such a landing gear.

The present invention will be best understood and other characteristics and advantages will become further apparent on reading the following detailed description comprising embodiments given by way of illustration with reference to the appended drawings, presented by way of non-limiting examples, which may serve to complete the understanding of the present invention and the description of its implementation and, where appropriate, contribute to its definition.

DETAILED DESCRIPTION OF THE INVENTION

Figure 1:
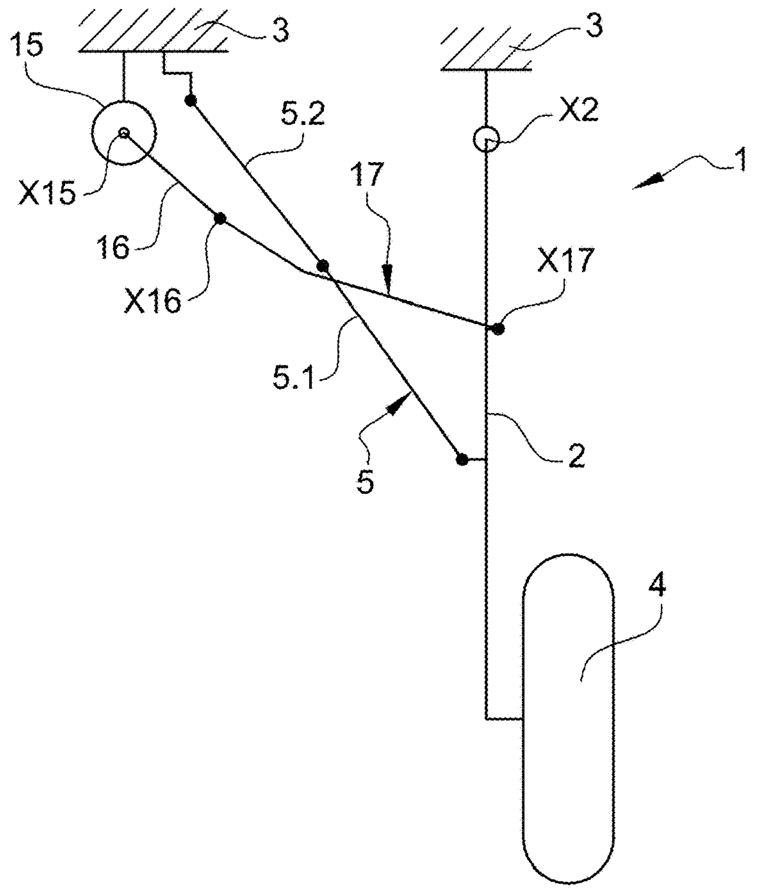
FIG. 1 is a diagrammatic view of an aircraft landing gear in a first embodiment of the invention, shown in its deployed position.

With reference to FIGS. 1 to 9, an aircraft landing gear 1 comprises, in a manner known per se, a leg 2 having a first end which is hinged to a structure 3 of an aircraft along a substantially horizontal hinge axis X2 in service, so as to be movable between a deployed position (FIGS. 1 and 6) to allow the aircraft to land, taxi and take off and a retracted position (FIGS. 4 and 9) allowing the landing gear to be stored in a hold of the aircraft. The leg 2 has a second end opposite the first end and carrying an axle on which one or more wheels 4 are mounted to pivot. The leg 2 is telescopic and comprises a box that is the part of the leg 2 hinged to the structure 3 and a rod that slides into the box and that carries the wheels, a damper being arranged in conventional manner between the box and the rod.

The landing gear 1 comprises a main brace, in this case in the form of a main strut 5 comprising a pair of connecting rods 5.1, 5.2 having ends hinged to each other, the connecting rod 5.1 having an opposite end hinged to the leg 2 and the connecting rod 5.2 having an opposite end hinged to the structure 3. The connecting rods 5.1, 5.2 are hinged to each other between an aligned position in which the main strut 5 is in a state in which the leg 2 is stabilised in the deployed position and a folded position in which the main strut 5 allows the landing gear 1 to be stored in the hold of the aircraft, the leg 2 being in the retracted position. In the aligned position, the connecting rods 5.1, 5.2 of the main strut 5 are in abutment against each other and the main strut 5 defines a main force take-up path allowing transmission of forces between the leg 2 and the structure 3 of the aircraft.

According to the invention, a rotary actuator 15 of the electromagnetic type is arranged on the structure 3 of the aircraft. The actuator 15 includes an output shaft mounted to rotate about an axis X15 that is substantially parallel to the hinge axis X2 of the leg 2. The axes X2, X15 in this case define a substantially horizontal plane in service so that the actuator 15 is arranged substantially at the same level (or height) as the hinge axis X2 of the leg 2. The actuator 15 is offset laterally relative to the hinging of the leg 2 and is positioned outside the main force path when the leg 2 is in the deployed position. This arrangement of the rotary actuator outside the main force path limits the stresses it undergoes, contributing to its durability.

The output shaft of the actuator 15 carries a crank 16 whose angular position relative to the structure 3 of the aircraft can be modified by powering the actuator 15 in order to rotate the output shaft of said actuator 15. The crank 16 is coupled to an element connected to the leg 2 by means of a connecting rod 17, a first end of which is hinged to said element about a hinge axis X17 and a second end of which is hinged to the crank 16 about a hinge axis X16. The hinge axes X16, X17 of the connecting rod 17 are in this case substantially parallel to the hinge axis X2 of the leg 2 and to the rotational axis X15 of the actuator 15. The crank 16 is the only crank actuated by the actuator 15.

Such an arrangement unambiguously links the angular position of the output shaft of the actuator 15 to the angular position of the leg 2 relative to the structure 3 of the aircraft.

According to the first embodiment shown in FIGS. 1 to 5, the element to which the first end of the connecting rod 17 is hinged is a part of the leg 2, namely the box.

Figure 5:
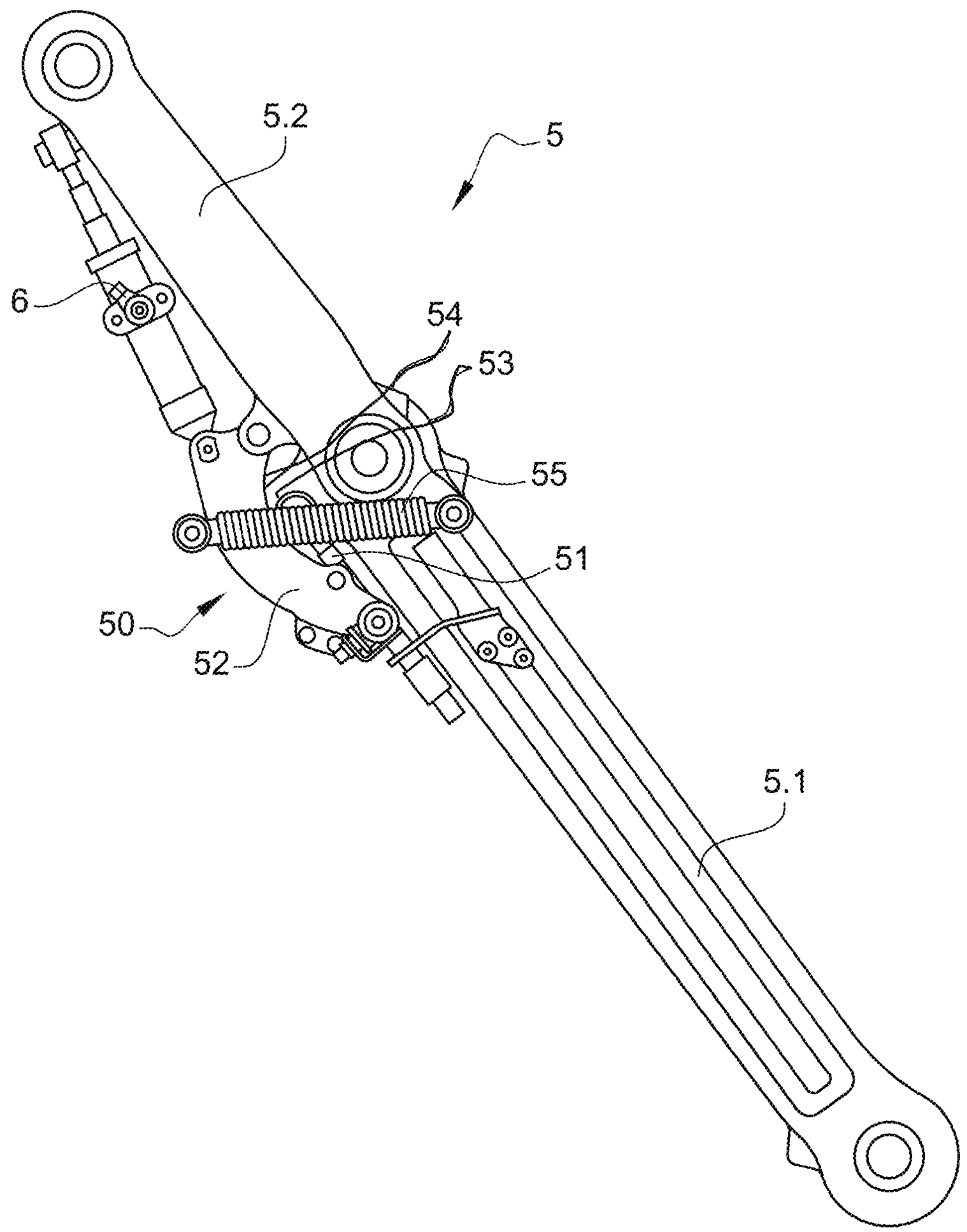
FIG. 5 is a detailed view of the main strut in its aligned state.

In this embodiment, the landing gear further comprises a secondary strut 50 for locking the main strut 5 and an actuator 6 for unlocking the secondary strut 50 which is known per se and makes it possible to move the connecting rods of the main strut 5 out of their aligned position (see FIG. 5). The secondary strut 50 comprises a first connecting link 51 having one end hinged to the first connecting rod 5.1 and a second connecting link 52 having a first end hinged to the second connecting rod 5.2 and a second end hinged to a second end of the first connecting link 51. The actuator 6 is hinged on one side to the second connecting rod 5.2 and on the other side to the second connecting link 52. In the deployed position of the main strut 5, the secondary strut 50 is in an aligned position stabilising the main strut 5 in its aligned position. In this example, the abutments 53, 54 are in the form of blocks extending at respective ends from the first and second connecting links 51, 52 closes to their hinge, to form a stop defining the deployed position of the main strut 5. In the aligned position of the secondary strut 50, the second connecting link 52, which is bent, surrounds the hinging of the first connecting link 51 to the first connecting rod 5.1, said hinging being aligned with the hinging of the second connecting link 52 to the second connecting rod 5.2 and the hinging of the connecting links 51, 52 to each other and is positioned between them. In this position, one side 53 of the end of the connecting link 51 hinged to the connecting rod 5.1 abuts against the inner side 54 of the bend formed by the connecting link 52. A tension spring 55 extends between the first connecting rod 5.1 and the second connecting link 52 in order, firstly, to hold the secondary strut 50 in its aligned position and, secondly, to hold the abutments 53, 54 bearing on each another.

The actuator 15, the crank 16 and the connecting rod 17 form a mechanism for manoeuvring the leg 2 from its deployed position to its retracted position, and a mechanism for stabilising the leg 2 in the retracted position.

In the deployed position of the leg 2, shown in FIG. 1, the connecting rods 5.1, 5.2 of the strut 5 are in the aligned position, in abutment against each other by the abutments 53 and 54 (visible in FIG. 5), and the angular position of the crank 16 relative to the connecting rod 17 is such that the connecting rod 17 extends substantially in line with the crank 16 in an imperfect alignment. More specifically, this imperfect alignment is not perfect, in that the crank 16 and the connecting rod 17 are slightly beyond their geometric alignment (which is defined when the axes X15, X16, X17 intersect on the same straight line). This makes it possible to avoid static indeterminacy and to ensure that it is the strut 5 that transmits forces between the leg 2 and the structure 3.

Figure 2:
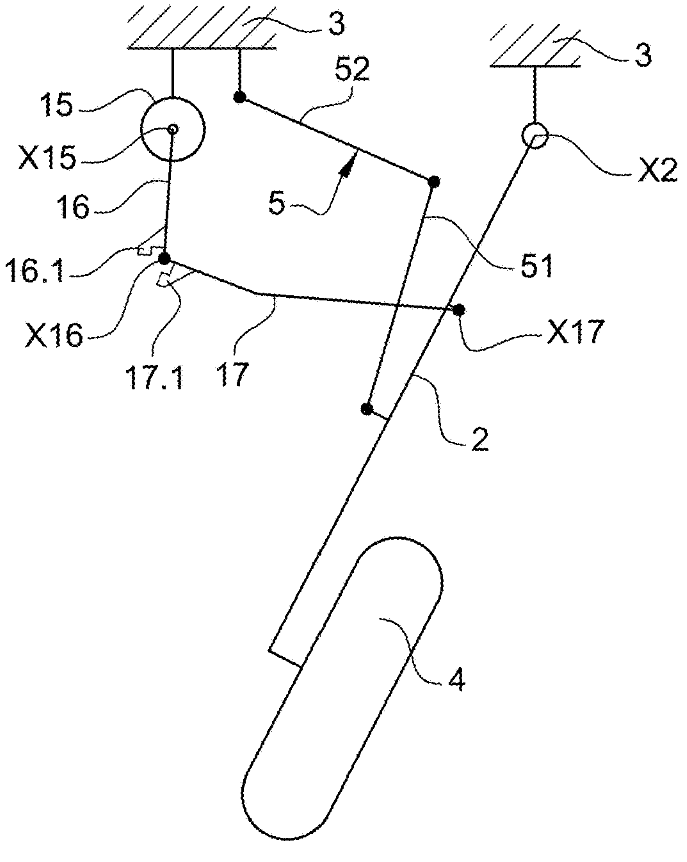
FIG. 2 is a view similar to FIG. 1 showing this aircraft landing gear in a first intermediate position.
Figure 3:
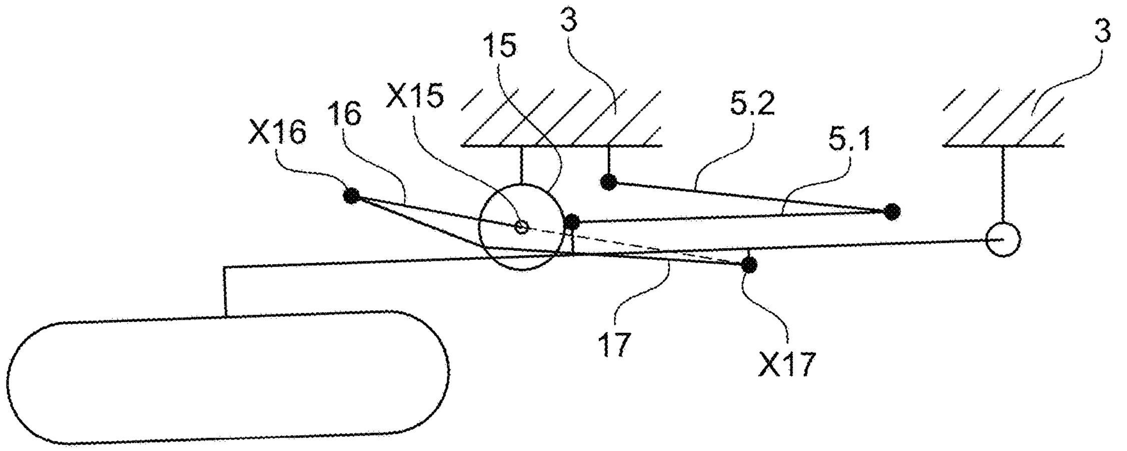
FIG. 3 is a view similar to FIG. 1 showing this aircraft landing gear in a second intermediate position.
Figure 4:
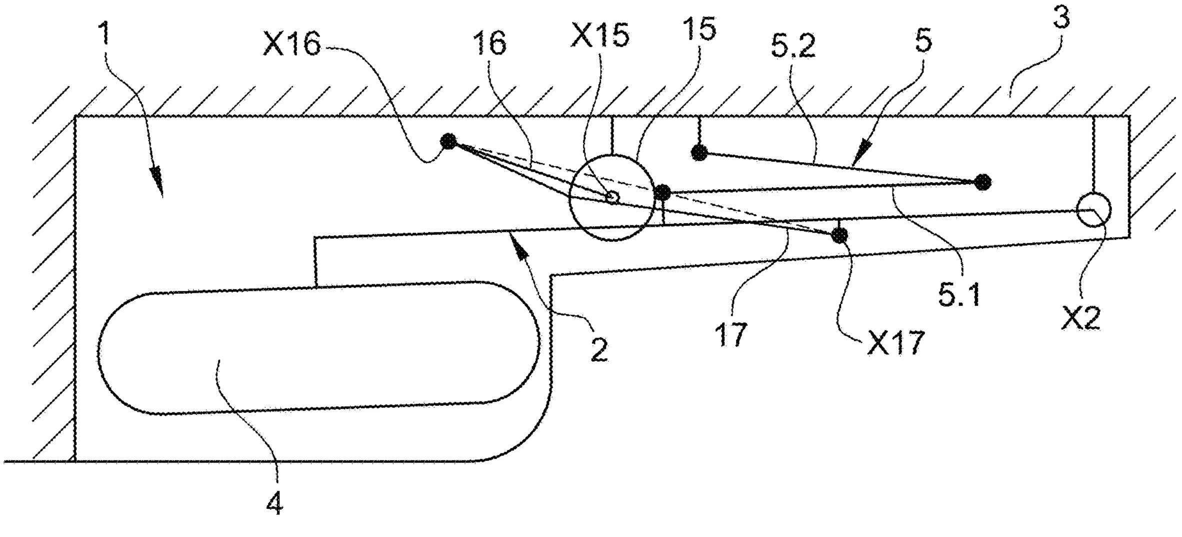
FIG. 4 is a view similar to FIG. 1 showing this aircraft landing gear in a retracted position.

To raise the leg 2 to the retracted position shown in FIG. 2, the actuator 6 is powered to unlock the secondary strut 50 by misaligning the connecting rods 5.1, 5.2 of the main strut 5 relative to each other and the actuator 15 is powered to rotate the output shaft of said actuator 15, and thus change the angular position of the crank 16 relative to the connecting rod 17. It will be understood that the rotation of the output shaft has the first effect of breaking the extended alignment of the crank 16 and the connecting rod 17 and then pulling on the connecting rod 17 coupled to the leg 2, which causes the leg 2 to rise to the retracted position (FIGS. 2 and 3).

As the actuator 15 continues to be powered, the leg 2 continues to rise to reach the retracted position in which the crank 16 and the connecting rod 17 are in a relative angular position such that the crank 16 and the connecting rod 17 are in a second substantially aligned position, called the retracted alignment, in which the crank 16 and the connecting rod 17 are folded. The retracted alignment is obtained by moving the crank 16 and the connecting rod 17 slightly beyond their geometric alignment (which is defined when the axes X15, X16, X17 intersect the same straight line) to make them bear against each other substantially at the rotational axis X15 of the actuator 15 via an abutment formed by one side of one end of the crank 16 (the retracted alignment is said to be overcentered; compare FIGS. 3 and 4). The axis X15 therefore lies between the axes X16 and X17: the connecting rod 17 is bent in such a manner that the hinge axes X16 and X17 intersect a straight line (shown in dashed lines in FIG. 4) extending from one side of the output shaft of the actuator 15 opposite the abutment. Thus stabilised, the crank 16 and the connecting rod 17 oppose the extension of the leg 2 about its hinge axis X2, such that the retracted position is stable. It should be noted that, in the retracted position, the actuator 15 is located in this case between the wheel 4 and the hinging of the strut to the leg 2.

For safety reasons, it may be necessary to provide a redundant force to keep the crank 16 and the connecting rod 17 in the retracted alignment position and thus avoid any untimely extension of the leg 2. By way of example, this force could be ensured by:

- the moment of inertia of the leg 2 about the axis X2; and/or
- the pre-crushing force exerted by slave control doors connected to the landing gear 1 and which act as springs; and/or
- aerodynamic forces exerted in flight on the hatches connected to the structure 3 of the aircraft; and/or
- a controlled action of the actuator 15, which requires very little energy; and/or
- a passive characteristic of the actuator 15 such as the engine brake, the cogging torque associated with the reduction ratio, the ratchet . . . ; and/or
- an independent spring.

With regard to the lowering of the leg 2 into the deployed position, it may be carried out under the effect of gravity after having provided the energy needed to break the retracted alignment of the crank 16 and the connecting rod 17, the actuator 15 being controlled to regulate the speed of descent of the leg 2. Indeed, the movement of the connecting rod 17 is continuous and without singularity in the direction of the lowering of the leg 2 so that the actuator 15 is always driven in the same direction and operates as a generator. The actuator 15 can therefore be used as a brake during lowering. To this end, it is of course appropriate for the actuator 15 to be reversible and to be able to be driven by the connecting rod 17 during the lowering of the leg 2.

Preferably, the actuator 15 will be chosen to be of the simplest and most reliable type possible. If possible, a direct drive torque motor type actuator with no reduction should be preferred. If a reducer were to be necessary, a very reliable reducer will be preferred, for example of the deformable bell type, better known by the trade name "harmonic drive", having a very low probability of seizure type failure.

According to the second embodiment shown in FIGS. 6 to 9, the element to which the first end of the connecting rod 17 is hinged is one of the connecting rods of the strut 5.

The actuator 15, the crank 16 and the connecting rod 17 therefore form a mechanism for stabilising the strut 5 in its deployed state, a mechanism for manoeuvring the leg 2 from its deployed position to its retracted position, and a mechanism for stabilising the leg 2 in the retracted position.

Figure 6:
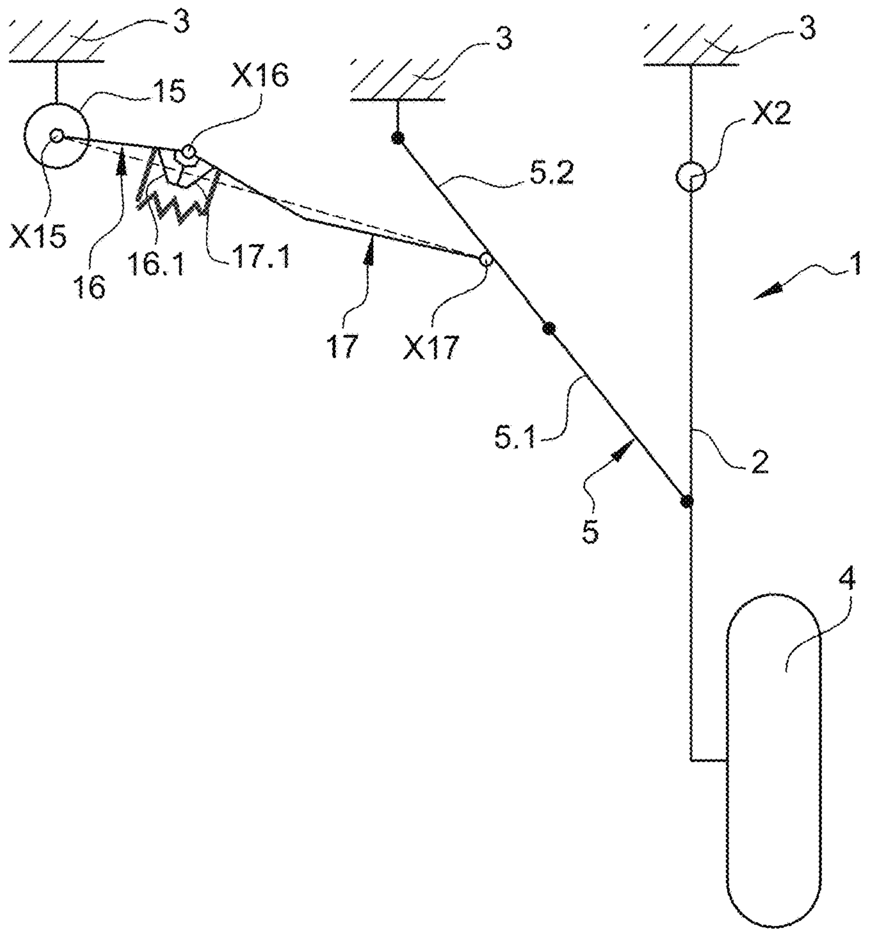
FIG. 6 is a diagrammatic view of an aircraft landing gear in a first embodiment of the invention, shown in its deployed position.
Figure 7:
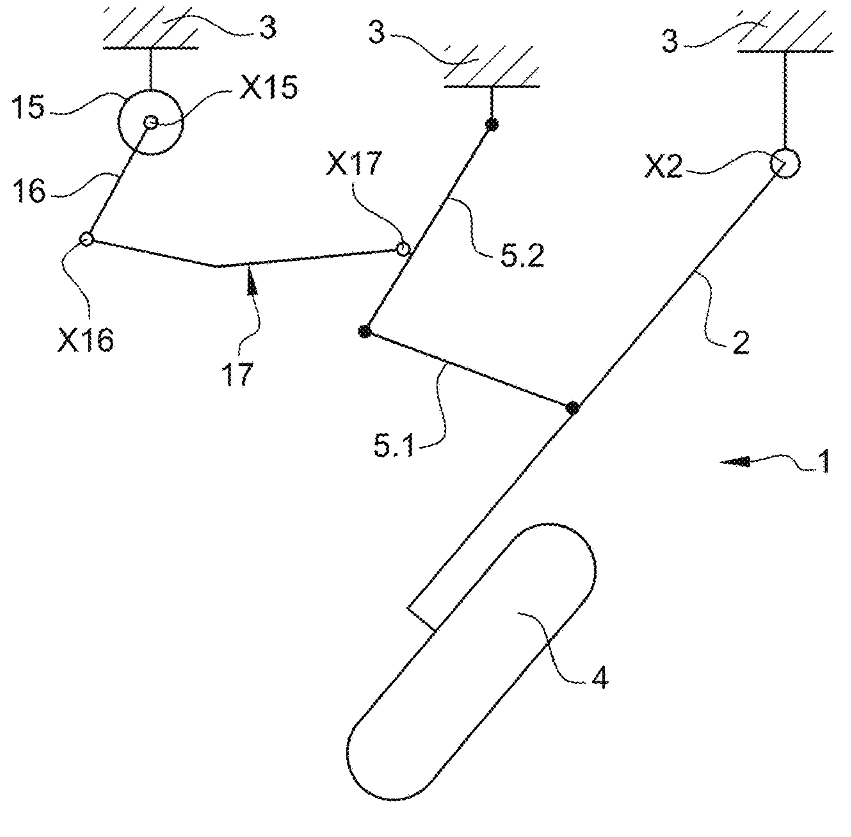
FIG. 7 is a view similar to FIG. 6 showing this aircraft landing gear in a first intermediate position.
Figure 8:
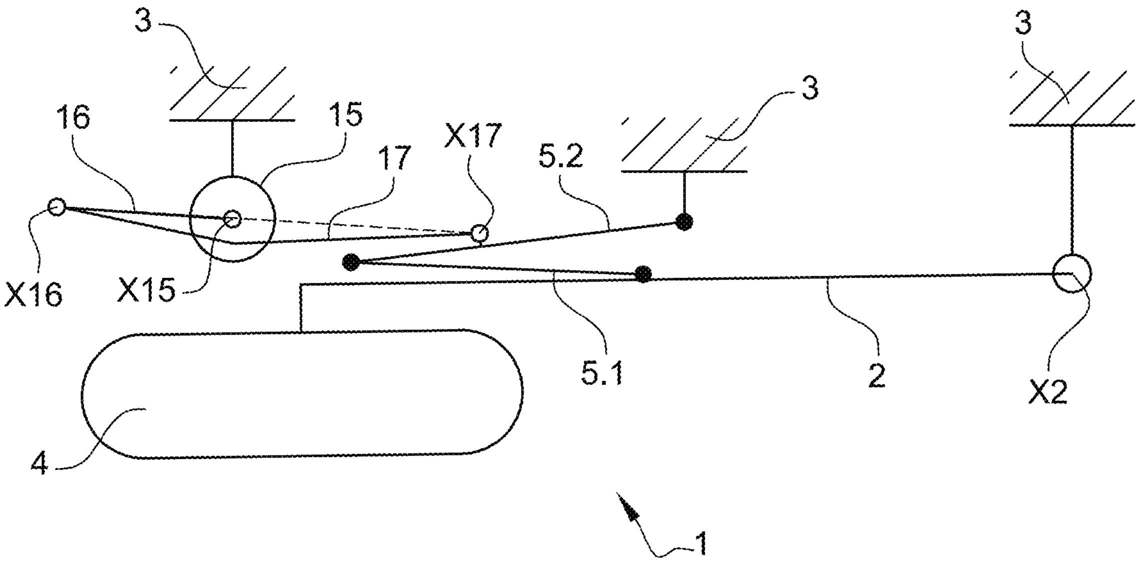
FIG. 8 is a view similar to FIG. 6 showing this aircraft landing gear in a second intermediate position.

In the deployed position of the leg 2 shown in FIG. 6, the connecting rods 5.1, 5.2 of the strut 5 are in the aligned position and the angular position of the crank 16 relative to the connecting rod 17 is such that the crank 16 and the connecting rod 17 are in a first substantially aligned position, called the deployed alignment, in which the connecting rod 17 extends substantially in line with the crank 16. More specifically, the deployed alignment is obtained by moving the crank 16 and the connecting rod 17 slightly beyond their geometric alignment (which is defined when the axes X15, X16, X17 intersect the same straight line). This alignment is said to be overcentered. The axis X16 is between the axes X15 and X17 and the crank 16 and the connecting rod 17 bear against each other via respective abutments 16.1, 17.1 (visible only in FIG. 6). In this example, the abutments 16.1, 17.1 are in the form of fingers extending at respective ends of the crank 16 and the connecting rod 17, in the vicinity of the hinge axis X16, to form a stop defining the deployed alignment.

For safety reasons, the crank 16 and the connecting rod 17 are held in the deployed alignment position by a locking member comprising, for example, at least one return spring (symbolised in FIG. 6) connecting the crank 16 to the connecting rod 17 by exerting a tensile force thereon tending to hold the abutments 16.1, 17.1 bearing against each other. As a variant, any other element providing a function of returning the crank 16 and the connecting rod 17 to the deployed alignment position defined by the abutments 16.1, 17.1 may be used.

Figure 9:
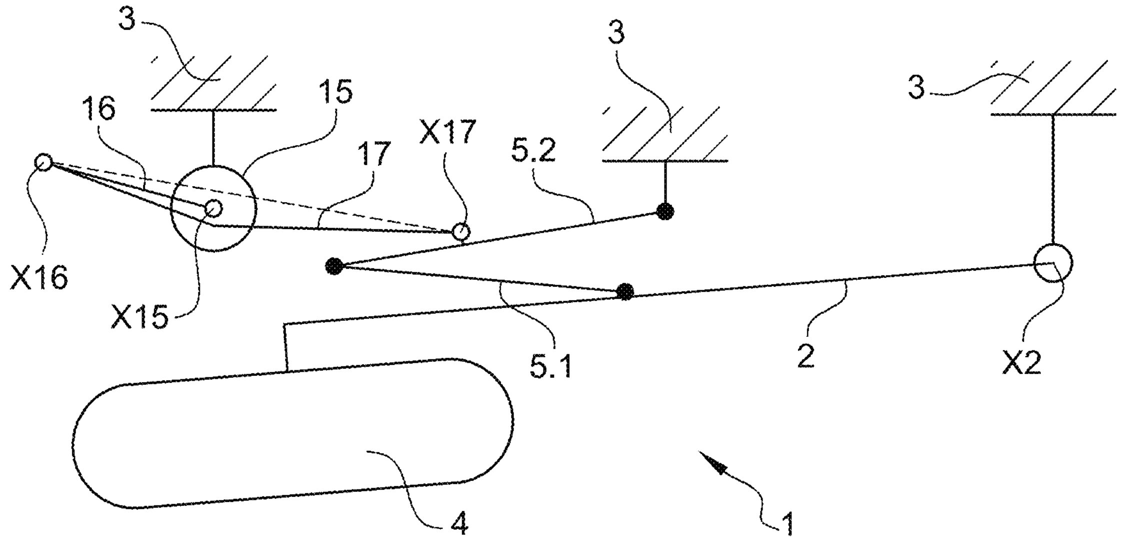
FIG. 9 is a view similar to FIG. 6 showing this aircraft landing gear in a retracted position.

To raise the leg 2 to the retracted position shown in FIG. 9, the actuator 15 is powered to rotate the output shaft of said actuator 15, and thus change the angular position of the crank 16 relative to the connecting rod 17. As shown FIG. 2, the rotation of the output shaft first breaks the deployed alignment of the crank 16 and the connecting rod 17 against the return springs and then pulls on the connecting rod 17, which causes the misalignment of the connecting rods 5.1, 5.2 of the strut 5 (FIG. 7) relative to each other and the raising of the leg 2 to the retracted position.

As the actuator 15 continues to be powered, the leg 2 continues to rise to the retracted position in which the crank 16 and the connecting rod 17 are in a relative angular position such that the crank 16 and the connecting rod 17 are in a second substantially aligned position, called the retracted alignment, in which the crank and the connecting rod 17 are folded and the strut 5 is folded. As with the deployed alignment, the second alignment is a position obtained by moving the crank 16 and the connecting rod 17 slightly beyond their geometric alignment (which is defined by the perfect alignment of the axes X15, X16, X17, the axes X15, X16, X17 then intersecting the same straight line) to make them bear against each other substantially at the rotational axis X15 of the actuator 15 via an abutment formed by one side of one end of the crank 16 (compare FIGS. 8 and 9). The axis X15 is between the axes X16 and X17. The connecting rod 17 is bent in such a manner that the hinge axes X16, x17 intersect a straight line (shown in dashed lines in FIG. 9) extending from a side of the output shaft of the actuator 15 opposite the abutment. Thus stabilised, the crank 16 and the connecting rod 17 oppose the extension of the leg 2 about its hinge axis X2, such that the retracted position is stable. It should be noted that, in the retracted position, the actuator 15 is located opposite the wheel 4.

Here again, it may be necessary to ensure a redundant force to keep the crank 16 and the connecting rod 17 in the retracted alignment position and thus avoid any untimely extension of the leg 2. By way of example, this force could be ensured by:

- the moment of inertia of the leg 2 about the axis X2; and/or
- the pre-crushing force exerted by slave control doors connected to the landing gear 1 and which act as springs; and/or
- aerodynamic forces exerted in flight on the hatches connected to the structure 3 of the aircraft; and/or
- a controlled action of the actuator 15, which requires very little energy; and/or a passive characteristic of the actuator 15 such as the engine brake, the cogging torque associated with the reduction ratio, the ratchet . . . ; and/or an independent spring.

The lowering of leg 2 takes place as above.

Naturally, the various characteristics, variants and/or forms of embodiments of this invention can be associated with one another in various combinations insofar as they are not incompatible or mutually exclusive. Furthermore, the invention is not limited to the embodiments described above and provided solely by way of example. It encompasses various modifications, alternative forms and other variants that may be considered by a person skilled in the art in the context of the present invention.

In particular, although in this case all the hinge axes X2, X15, X16, X17 are parallel to one another, the invention applies also to linkages with non-parallel axes, provided that the crank 16/connecting rod 17 assembly comes into alignment when the leg is in the deployed and/or retracted position.

The abutments 16.1, 17.1 can be placed directly on the crank 16 and the connecting rod 17 as shown in FIG. 6, but also on the structure 3 of the aircraft to cooperate with one of them and stop it in the imperfect alignment or deployed alignment position.

Although the abutment defining the retracted alignment position of the crank 16 and the connecting rod 17 is in this case placed on said crank 16, it can also be placed on said connecting rod 17 to cooperate with the crank 16 and stop the latter in the retracted alignment position.

Although the axes X2, X15 in this case define a substantially horizontal plane, the actuator 15 may also be arranged so that the axis X15 is in service above the axis X2, that is to say arranged more deeply in the space accommodating the leg 2 in the retracted position.

The main brace may be of any type and for example a telescopic bar or be of the plunger type.

The second abutment is positioned between the connecting rod 17 and the shaft of the actuator 15, or is a part integral with said shaft, or is arranged directly between the crank 16 and the connecting rod 17.

The springs may be of a different type from those described, for example elastic blades, and may be positioned differently in the drive train.

The invention applies to any landing gear and in particular to landing gear having a rocker leg.

The invention claimed is:

1. An aircraft provided with a landing gear comprising a leg having a hinge for pivoting between a retracted position in a hold of the aircraft and a deployed position, a main brace having a state in which the leg is stabilized in the deployed position, in which the main brace defines a main force path, a maneuvering mechanism for maneuvering the leg at least from the deployed position to the retracted position, and a stabilizing mechanism for stabilizing the leg in the retracted position, wherein the maneuvering mechanism comprises a rotary actuator which is positioned in the hold outside the main force path when the leg is in the deployed position and which actuates a crank, and a connecting rod having a first end hinged about a first axis to an element connected to the leg and a second end hinged about a second axis to the crank so that the connecting rod and the crank have a first relative angular position in which the first axis and the second axis are in a first alignment with respect to a shaft of the rotary actuator when the leg is in the retracted position so that the connecting rod and the crank stabilize a strut in the retracted position and form the stabilizing mechanism for stabilizing the leg in the retracted position, wherein the element to which the first end of the connecting rod is hinged is a part of the leg and the landing gear comprises a locking mechanism for locking the main brace in a holding state.

2. The aircraft according to claim 1, wherein the rotary actuator is positioned substantially at the same height as the hinge of the leg in a position laterally spaced apart from the hinge of the leg.

3. The aircraft according to claim 1, further comprising at least one second abutment integral with one side of the rotary actuator to define the first alignment in which the connecting rod and the crank are folded, the at least one second abutment being positioned between the connecting rod and the shaft of the rotary actuator or being a part integral with said shaft, or being arranged directly between the crank and the connecting rod.

4. An aircraft provided with a landing gear comprising a leg having a hinge for pivoting between a retracted position in a hold of the aircraft and a deployed position, a main brace having a state in which the leg is stabilized in the deployed position, in which the main brace defines a main force path, a maneuvering mechanism for maneuvering the leg at least from the deployed position to the retracted position, and a stabilizing mechanism for stabilizing the leg in the retracted position, wherein the maneuvering mechanism comprises a rotary actuator which is positioned in the hold outside the main force path when the leg is in the deployed position and which actuates a crank, and a connecting rod having a first end hinged about a first axis to an element connected to the leg and a second end hinged about a second axis to the crank so that the connecting rod and the crank have a first relative angular position in which the first axis and the second axis are in a first alignment with respect to a shaft of the rotary actuator when the leg is in the retracted position so that the connecting rod and the crank stabilize a strut in the retracted position and form the stabilizing mechanism for stabilizing the leg in the retracted position, wherein the element to which the first end of the connecting rod is hinged is a part of the main brace and the connecting rod and the crank have a second relative angular position in which the first axis and the second axis are in a second alignment relative to the shaft of the rotary actuator when the leg is in the deployed position in such a way that the connecting rod and the crank stabilize the main brace in the holding state to form a main brace stabilizing mechanism for stabilizing the main brace in a stabilized state, and wherein the crank and the connecting rod are held in the second relative angular position by a locking member.

5. The aircraft according to claim 4, further comprising at least one second abutment integral with one side of the rotary actuator to define the first alignment in which the connecting rod and the crank are folded, the at least one second abutment being positioned between the connecting rod and the shaft of the rotary actuator or being a part integral with said shaft, or being arranged directly between the crank and the connecting rod.

6. The aircraft according to claim 4, wherein the locking member comprises at least one elastically deformable return element returning the crank and the connecting rod to the second alignment.

7. The aircraft according to claim 6, comprising first abutments integral respectively with the crank and with the connecting rod in order to define the second alignment in which the connecting rod extends substantially in line with the crank.

* * * * *